(12) United States Patent
Iwata

(10) Patent No.: US 7,394,501 B2
(45) Date of Patent: Jul. 1, 2008

(54) INFORMATION DISPLAY APPARATUS AND DISPLAY CONTROL METHOD

(75) Inventor: Takeshi Iwata, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 400 days.

(21) Appl. No.: 11/082,035

(22) Filed: Mar. 17, 2005

(65) Prior Publication Data

US 2006/0005134 A1 Jan. 5, 2006

(30) Foreign Application Priority Data

Jun. 30, 2004 (JP) ............................. 2004-192938

(51) Int. Cl.
*H04N 3/27* (2006.01)
*H04N 7/01* (2006.01)

(52) U.S. Cl. ....................... 348/554; 715/718; 348/581; 348/441

(58) Field of Classification Search ................. 348/441, 348/448, 458, 581, 553–556; 345/3.3, 3.4, 345/667–671; 382/298–300; 386/123; 715/718
See application file for complete search history.

(56) References Cited

U.S. PATENT DOCUMENTS

| | | | | |
|---|---|---|---|---|
| 5,796,442 A | * | 8/1998 | Gove et al. ................... | 348/556 |
| 6,144,412 A | * | 11/2000 | Hirano et al. ................ | 348/441 |
| 6,310,654 B1 | * | 10/2001 | Oku et al. .................... | 348/554 |
| 6,717,961 B1 | * | 4/2004 | Park ........................... | 370/538 |
| 6,798,458 B1 | * | 9/2004 | Unemura .................... | 348/448 |
| 7,206,025 B2 | * | 4/2007 | Choi .......................... | 348/441 |
| 2004/0233997 A1 | * | 11/2004 | Umesako ............... | 375/240.26 |
| 2006/0056716 A1 | * | 3/2006 | Komeno ..................... | 382/233 |

FOREIGN PATENT DOCUMENTS

| JP | 06-284364 A | 10/1994 |
|---|---|---|
| JP | 10-301551 | 11/1998 |
| JP | 2000-155998 | 6/2000 |

\* cited by examiner

*Primary Examiner*—Victor R. Kostak
(74) *Attorney, Agent, or Firm*—Pillsbury Winthrop Shaw Pittman, LLP

(57) ABSTRACT

An information processing apparatus is disclosed that comprises a display device, first and a second display controllers, and a switch. The first display controller converts an externally input first video signal into a second video signal which can be displayed on the display device. The second display controller converts the first video signal into a third video signal which can be displayed on the display device. The switch switches between a first path for outputting the second video signal converted by the first display controller to the display device, and a second path for outputting the third video signal converted by the second display controller to the display device.

5 Claims, 4 Drawing Sheets

INFORMATION DISPLAY APPARATUS AND DISPLAY CONTROL METHOD

CROSS-REFERENCE TO RELATED APPLICATIONS

This application is based upon and claims the benefit of priority from prior Japanese Patent Application No. 2004-192938, filed Jun. 30, 2004, the entire contents of which are incorporated herein by reference.

BACKGROUND OF THE INVENTION

1. Field of the Invention

The present invention relates to an information processing apparatus which handles video data, and a display control method thereof.

2. Description of the Related Art

In recent years, as described in, e.g., Jpn. Pat. Appln. KOKAI Publication No. 6-284364, personal computers with an audio-visual (AV) playback function have prevailed. This AV playback function allows the user to appreciate program information such as externally provided television (TV) broadcasting or the like, and various kinds of AV information such as moving image information provided by an external video playback apparatus.

In a personal computer with such an AV playback function, if a function of displaying an externally input video signal of, e.g., a television game or the like with high image quality without any time delay is to be provided in addition to the video recording and playback functions of externally input TV video data or the like, the video recording and playback function of TV video data and the high-image quality display function without any time delay must be implemented by independent hardware components, resulting in a complex and expensive arrangement.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below serve to explain the principles of the invention.

DETAILED DESCRIPTION OF THE INVENTION

An embodiment of the present invention will be described hereinafter with reference to the accompanying drawings.

Figure 1:
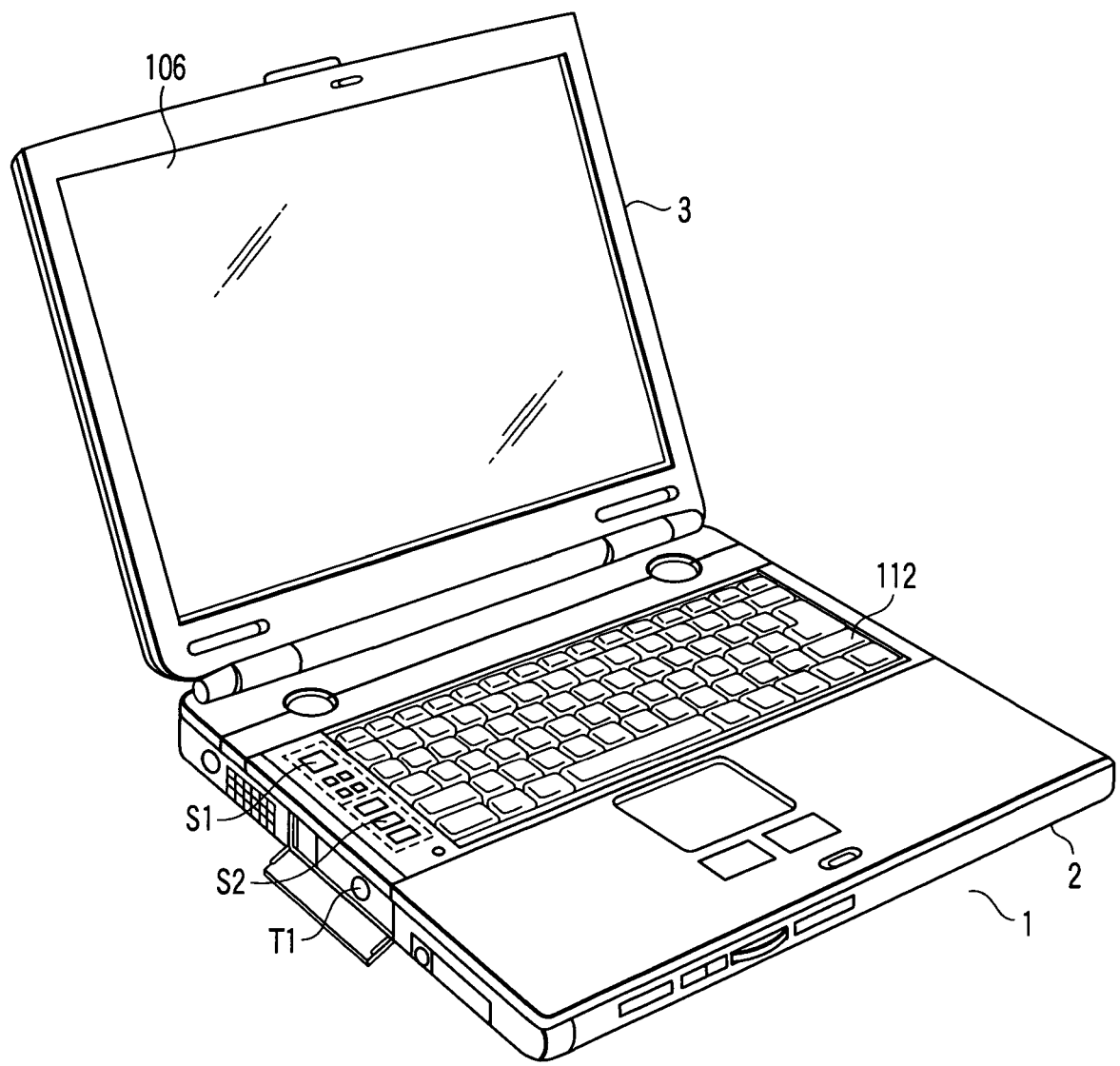
FIG. 1 is a perspective view showing an example of the outer appearance of a personal computer according to an embodiment of the present invention.

FIG. 1 shows an outer appearance of an information processing apparatus according to the embodiment of the present invention. FIG. 1 exemplifies a notebook-type personal computer. A personal computer 1 comprises an apparatus main body 2 and display unit 3. A display 106 using an liquid crystal display (LCD) is provided nearly the center of the display unit 3 so that its display surface is exposed. The display unit 3 is attached to the apparatus main body 2 to be pivotal between the open and closed positions. FIG. 1 shows the display unit 3 which is open with respect to the apparatus main body 2. An external video signal input terminal T1 that can input an external video signal (composite signal) is provided on the side surface of the apparatus main body 2. A keyboard unit 112, a power switch S1 used to turn on/off the power supply of the personal computer 1, a display select switch (monitor display select button) S2 used to switch display information (display path) to be displayed on the display 106, and the like are provided on the upper surface of the apparatus main body 2. The display select switch S2 is operated every time a first display processing means which converts a video signal input to the external video signal input terminal T1 into data that allows an internal process and video recording, and then executes a playback process of the converted data, and a second display processing means which directly executes a high-image quality process of a video signal input to the external video signal input terminal T1 to display it in real time are switched. Display paths formed by the first display processing means are indicated by P1 and P2 in FIG. 5, and that formed by the second display processing means is indicated by P3 in FIG. 5.

Figure 2:
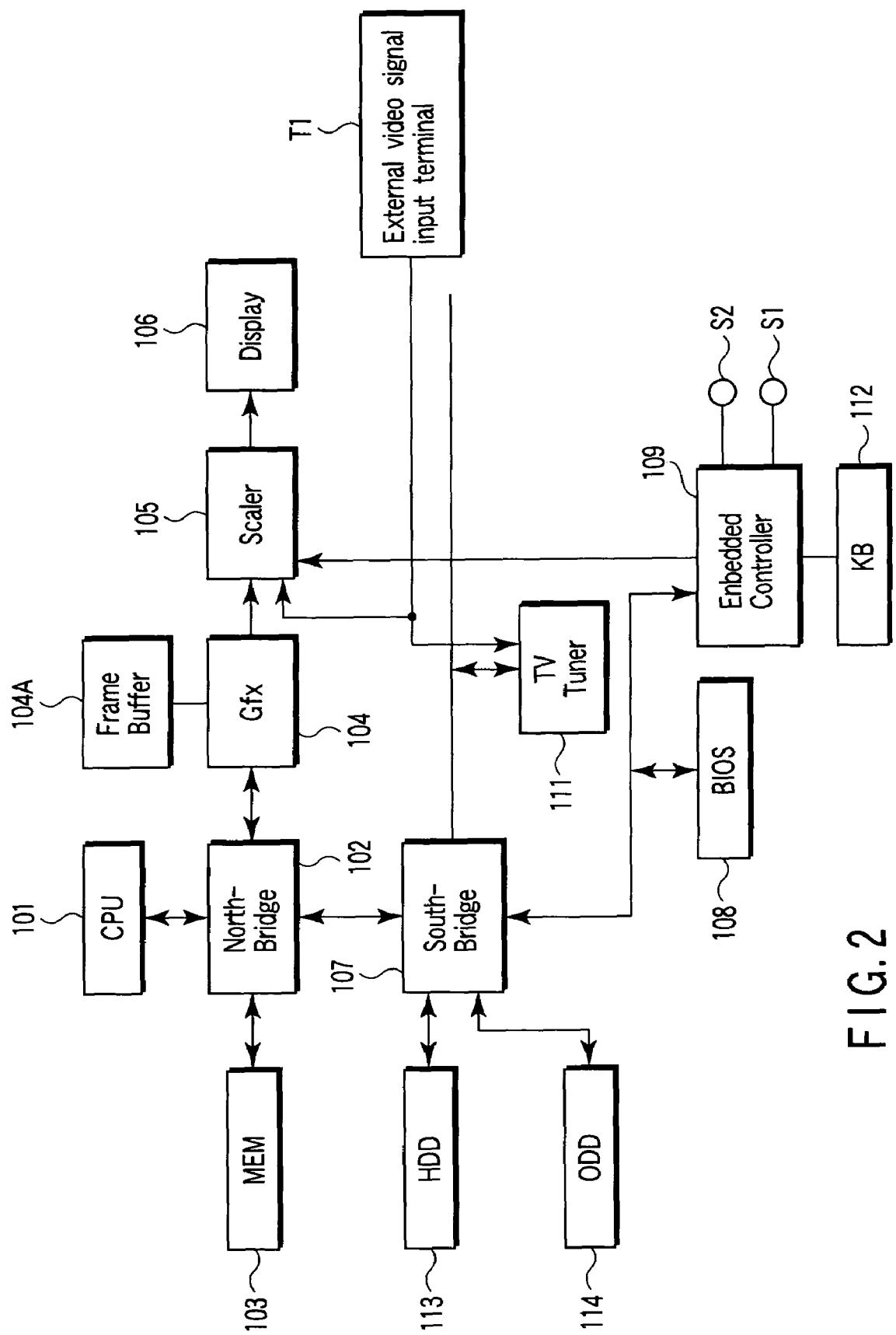
FIG. 2 is a block diagram showing an example of the arrangement of the personal computer according to the embodiment of the present invention.

An example of the system arrangement of the personal computer 1 according to the embodiment of the present invention will be described below with reference to FIG. 2. Note that building components of an audio (sound) system are not shown for the sake of simplicity.

The personal computer 1 comprises various building components such as a CPU 101, a north bridge 102 and south bridge 107, a main memory (MEM) 103, a graphics controller (Gfx) 104, a scaler unit 105, the display (LCD) 106, a BIOS-ROM 108, an embedded controller 109, a TV tuner unit 111, the keyboard unit (KB) 112, a hard disk drive (HDD) 113, a magneto-optical disk drive (ODD) 114, the external video signal input terminal (composite signal input terminal) T1, and the like.

The external video signal input terminal T1 is a common external signal input terminal which supplies an externally input video signal (composite) signal to the scaler unit 105 and TV tuner unit 111.

The CPU 101 is a processor adopted to control the operation of the computer according to the embodiment of the present invention. The CPU 101 executes an operating system (OS) and various applications/utility programs loaded from the hard disk drive 113 into the main memory 103. The CPU 101 also executes a basic input-output system (BIOS) stored in the BIOS-ROM 108. Furthermore, the CPU 101 expands (decodes) compressed (encoded) video data on a bus according to an MPEG2 decoding program stored in the main memory 103 when the video data which is compressed (encoded) by an MPEG2 encoder of the TV tuner unit 111 is passed to the graphics controller 104 via the bus.

The north bridge 102 is a bridge device that connects between a local bus of the CPU 101 and the south bridge 107. The north bridge 102 incorporates a memory controller (not shown) that controls access to the main memory 103. The graphics controller 104 is connected to the north bridge 102.

The main memory 103 stores the operating system, various application programs, utility programs, the MPEG2 decoding program, and the like, which are to be executed by the CPU 101.

The graphics controller 104 has a frame buffer 104A used to generate display data, and outputs MPEG2 decoded data to the scaler unit 105 via a dedicated signal line. Also, the graphics controller 104 has a display control means that directly displays information (internally processed information), which is internally processed (by the CPU 101) according to various application programs, on the display 106 without going through the scaler unit 105.

Figure 3:
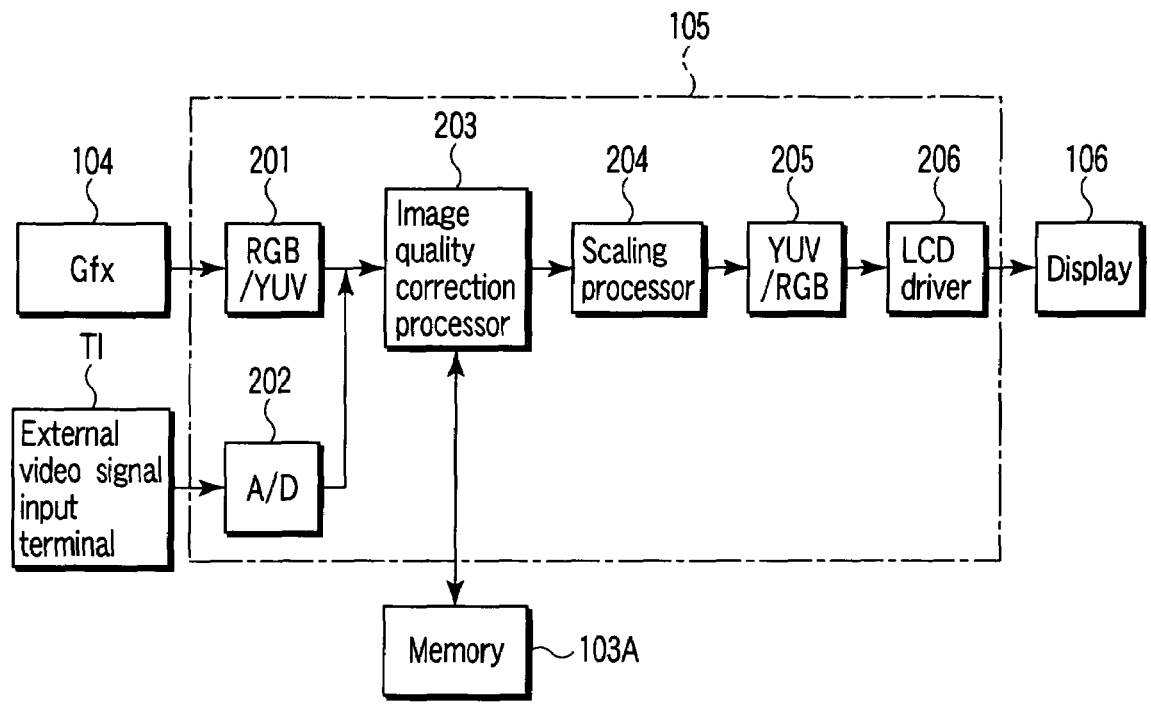
FIG. 3 is a block diagram showing an example of the arrangement of a scaler unit according to the embodiment of the present invention.

The scaler unit 105 comprises an RGB/YUV converter 201, analog-to-digital converter 202, image quality correction processor 203, scaling processor 204, YUV/RGB converter 205, LCD driver 206, and the like, as shown in FIG. 3. Note that building components of an audio system are not shown in FIG. 3 for the sake of simplicity.

The RGB/YUV converter 201 converts a video signal received from the graphics controller 104 from an RGB signal into a YUV signal. The analog-to-digital converter 202 converts an analog video signal (composite signal) input to the external video signal input terminal T1 into a digital YUV signal.

The image quality correction processor 203 comprises a dedicated processor. The processor 203 receives a display select instruction signal from the embedded controller 109, and switches video data to be displayed every signal input. In this case, the processor 203 selects and inputs one of a video signal which is input from the graphics controller 104 via the RGB/YUV processor 201, and a video signal which is input from the external video signal input terminal T1 via the analog-to-digital converter 202, and disables the other video signal input. The image quality correction processor 203 applies arithmetic processes for image quality correction (color adjustment, sharpness adjustment, luminance adjustment, edge emphasis, noise reduction, motion compensation, and the like) for the input YUV signal using setting parameters stored in an image quality processing memory 103A.

The scaling processor 204 executes a scaling process of an image data size (resolution) for the YUV signal that has undergone image quality correction by the image quality correction processor 203 in accordance with set scaling parameters. The YUV/RGB converter 205 converts the scaled video signal from a YUV signal into an RGB signal. The LCD driver 206 generates an LCD display signal according to the RGB signal output from the YUV/RGB converter 205 or internally processed display data (RGB signal) directly input from the graphics controller 104, and controls to drive the display 106.

In the scaler unit 105 with the above components, outputs of video signals input to the external video signal input terminal T1 have a time difference between a video signal input from the graphics controller 104 via the RGB/YUV converter 201 and a video signal input from the external video signal input terminal T1 via the analog-to-digital converter 202. That is, the video signal input from the graphics controller 104 via the RGB/YUV converter 201 is compressed (encoded by MPEG2) in the TV tuner unit 111 (to be described in detail later) and is expanded (decoded) by the process of the CPU 101, while the video signal directly input from the external video signal input terminal T1 via the analog-to-digital converter 202 does not undergo any process that takes much time. Therefore, the video signal input from the graphics controller 104 via the RGB/YUV converter 201 suffers a time delay of 1 sec or more, while the video signal input from the external video signal input terminal T1 via the analog-to-digital converter 202 suffers almost no time delay. For example, a live video picture according to the video signal input to the external video signal input terminal T1 can be displayed on the display 106 while being recorded on the hard disk drive 113 (see paths P1 and P2 and path P4 shown in FIG. 5). In this case, however, a time delay is produced since the MPEG2 encoding and decoding processes are executed. In contrast, as for monitor display, since the video signal input from the external video signal input terminal T1 via the analog-to-digital converter 202 is directly displayed on the display 106, a video picture can be displayed without any time delay. In this way, various problems due to time delay of display can be solved.

The display 106 displays a live video picture according to the RGB signal input from the scaler unit 105, an internally processed operation window, processed information, and the like on the LCD screen.

The south bridge 107 is a bridge device connected to the north bridge 102. The BIOS-ROM 108, embedded controller 109, TV tuner unit 111, hard disk drive 113, magneto-optical disk drive 114, and the like are connected to the south bridge 107.

The BIOS-ROM 108 stores a BIOS to be executed by the CPU 101. The embedded controller 109 is a single-chip microcomputer which integrates controller that controls peripheral function circuits including power management, and a keyboard controller that controls the keyboard unit 112.

A display select switch S2 as a building component which implements the display select control according to the present invention is connected to this embedded controller 109, in addition to the building components such as the keyboard unit 112, power switch S1, and the like. The embedded controller 109 outputs a display select instruction signal to the scaler unit 105 every time the display select switch S2 is operated.

The hard disk drive 113 stores the OS, device drivers, application programs to be executed, data generated upon execution of the application programs, and the like. These items are transferred to the main memory 103 as needed for a program process of the CPU 101, and undergo processing by the CPU 101. Furthermore, the hard disk drive 113 has a video recording area for video data which is compressed by MPEG2 in the TV tuner unit 111. Video data to be recorded in this case is supplied via paths P1 and P4 (signal routes) shown in FIG. 5.

The graphics controller 104 is used in playback, recording, and the like of a DVD. For example, moving image data (MPEG2 data) of a movie or the like, which is played back from a DVD, is decoded by the CPU 101, and is displayed on the display 106 via the graphics controller 104 and scaler unit 105.

Figure 4:
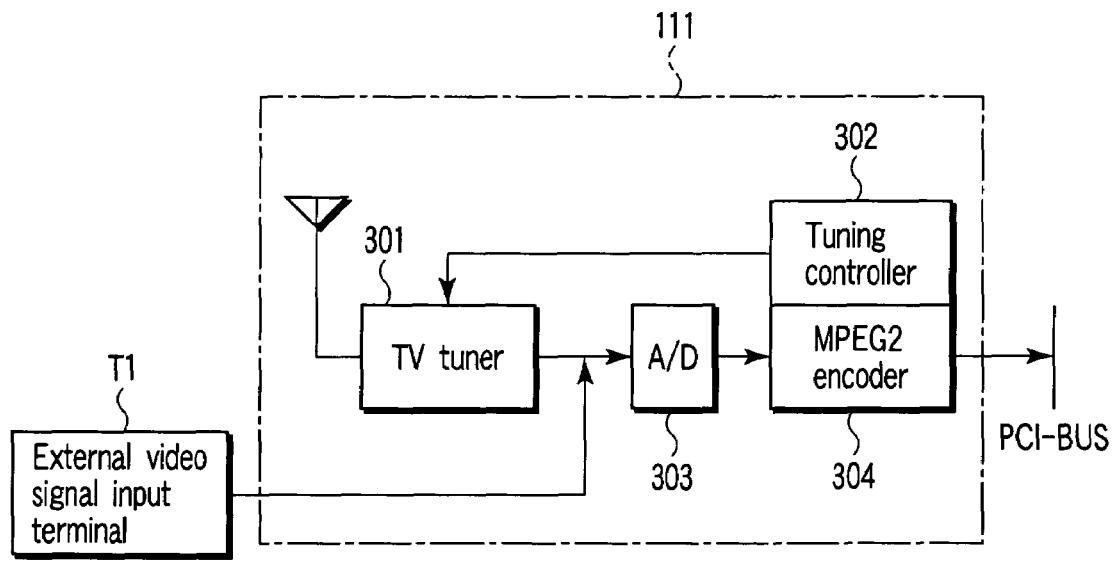
FIG. 4 is a block diagram showing an example of the arrangement of a TV tuner unit according to the embodiment of the present invention.

The TV tuner unit 111 comprises a TV tuner 301, tuning controller 302, analog-to-digital converter 303, MPEG2 encoder 304, and the like, as shown in FIG. 4. Note that building components of an audio system are not shown in FIG. 4 for the sake of simplicity.

The TV tuner 301 receives television broadcasting under the control of the tuning controller 302, and outputs the received video signal to the analog-to-digital converter 303. The analog-to-digital converter 303 converts an analog video signal input from the TV tuner 301 into a digital YUV signal (video data). The analog-to-digital converter 303 converts a video signal (composite signal) input to the external video signal input terminal T1 from an analog signal into a digital YUV signal (video data). YUV video data converted by the analog-to-digital converter 303 is output to the MPEG2 encoder 304. The MPEG2 encoder 304 compresses (encodes) the input YUV video data in accordance with the MPEG2 format, and outputs the compressed video data onto a bus (PCI-BUS). The video data output onto the bus can be recorded on the hard disk drive 113 (see paths P1 and P4 shown in FIG. 5).

Figure 5:
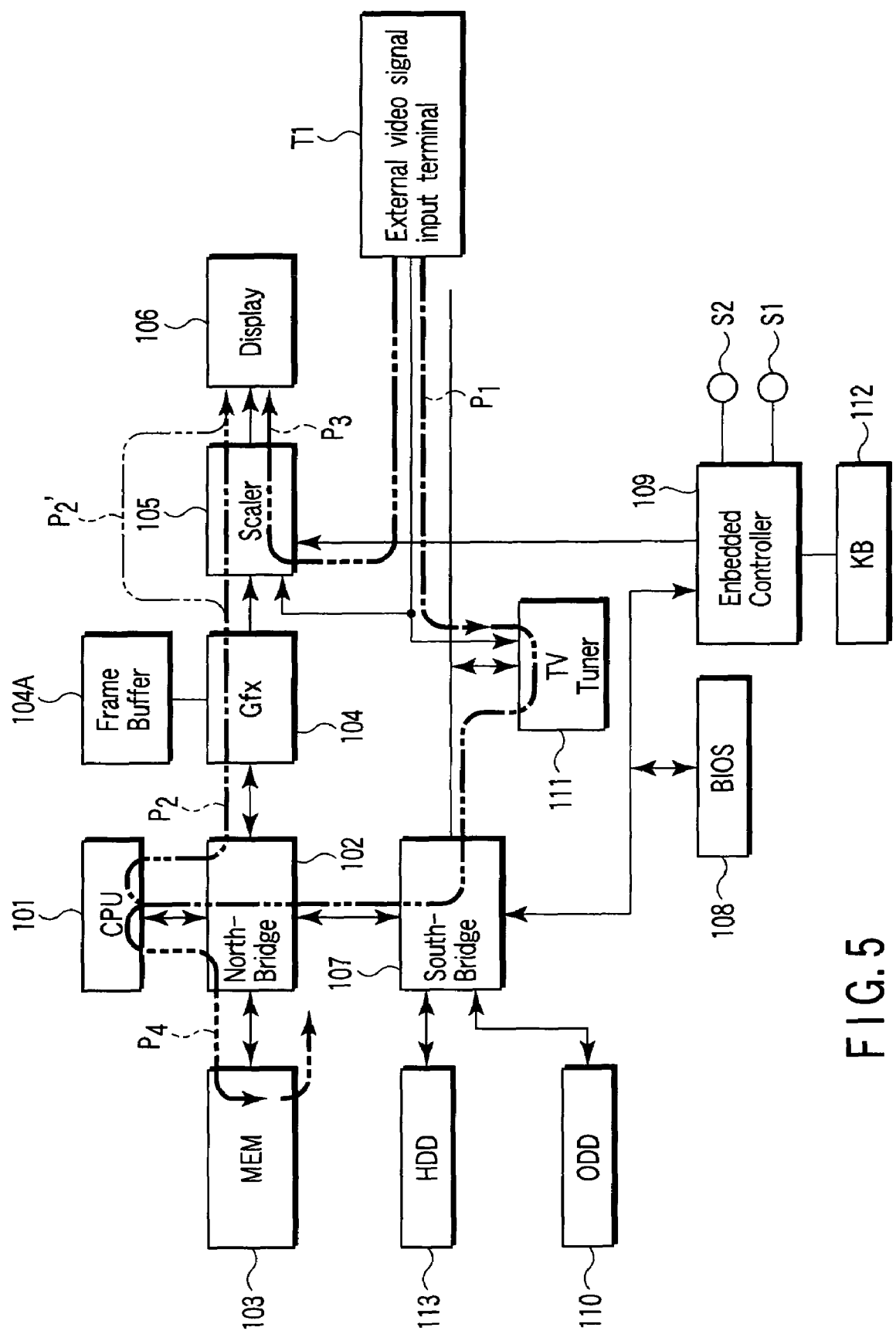
FIG. 5 is a signal processing route chart for explaining an example of the operation according to the embodiment of the present invention.

FIG. 5 shows display routes (display paths) using the external video signal input terminal T1 which is common to the scaler unit 105 and TV tuner unit 111.

When a video signal (composite signal) of a live video picture or the like received by an external TV or the like is input to the external video signal input terminal T1, this video signal is supplied to the scaler unit 105 and TV tuner unit 111.

In this case, if, for example, a display mode for displaying a video signal input from the graphics controller 104 via the RGB/YUV converter 201 is selected by the display select switch S2, display paths P1 and P2 that go through the TV tuner unit 111, internal bus (including the north bridge 102 and south bridge 107), and graphics controller 104 are formed. In this case, the video signal input to the external video signal input terminal T1 is input to the scaler unit 105 after it is compressed (encoded) according to MPEG2 by the MPEG2 encoder 304 of the TV tuner unit 111, and is expanded (decoded) according to the MPEG2 decoding program of the CPU 101, thus producing a time delay in display. Upon forming this display path, however, video information according to the video signal input to the external video signal input terminal T1 can be recorded on the hard disk drive 113. The video recording path in this case is indicated by P4 in FIG. 5.

When the display select switch S2 is operated in this state, a display select instruction signal is supplied from the embedded controller 109 to the scaler unit 105 in response to that operation, and the display path is switched from P1 and P2 to P3. In this case, since the video signal input to the external video signal input terminal T1 is directly input to the scaler unit 105 and is displayed on the display 106, no time delay due to the MPEG2 processing is produced. Hence, various problems due to time delay in display in programs including various games that have a problem in a time difference can be solved. Note that a displayed video picture can be recorded even upon forming this display path (P3) (see paths P1 and P4).

Also, the display paths that go through the graphics controller 104 include a display path that displays internally processed display information (by the CPU 101) of various applications and the like in addition to the aforementioned paths. The display path of the internally processed information is indicated by P2' in FIG. 5. In this case, display data generated by the graphics controller 104 upon an internal process is output to and displayed on the display 106 via the LCD driver 206 without going through the processing function of the scaler unit 105.

As described above, according to the embodiment of the present invention, the video recording and playback functions of an externally input video signal, and a function of displaying an externally input video signal with high image quality without any time delay can be implemented by an economically advantageous arrangement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a display device;
a first display controller which converts an externally input first video signal into a second video signal which can be displayed on the display device;
a second display controller which converts the first video signal into a third video signal which can be displayed on the display device; and
a switch means for switching between a first path for outputting the second video signal converted by the first display controller to the display device, and a second path for outputting the third video signal converted by the second display controller to the display device;
an external signal input terminal which is common to the first and second display controllers and is used to supply the externally input first video signal to the first and second display controllers; and
a television tuner unit which includes a conversion circuit which converts the first video signal input to the external signal input terminal into playback data that allows an internal process, a compression circuit which compresses the playback data converted by the conversion circuit, and a tuner which receives television broadcasting, the television tuner unit being arranged between the external signal input terminal and the first display controller.

2. The apparatus according to claim 1, further comprising:
a scaler unit which includes a dedicated processor which improves image quality of the second and third video signal converted by the first and second display controller respectively, a scaler which scales a display size of the first and second video signal to a screen configuration of the display device, and a display driver which displays the second and third video signal, whose display size has been scaled to the screen configuration of the display device, on the display device.

3. The apparatus according to claim 2, further comprising:
a bypass controller which displays the second video signal converted by the first display controller on the display device by bypassing the scaler unit.

4. The apparatus according to claim 1, further comprising:
a select switch which switches between display on the display device of the second video signal converted by the first display controller, and display on the display device of the third video signal converted by the second display controller.

5. A display control method in an information processing apparatus which causes first and second display controllers to convert a first video signal externally input via an external signal input terminal to second and third video signals, respectively, which can be displayed on a display device, and causes a control means to selectively display the second or third video signals on the display device, the information processing apparatus comprising a television tuner unit between the external signal input terminal and the first display controller, said method comprising:
causing the television tuner unit to convert the first video signal externally input via the external signal input terminal to playback data that allows an internal processing, compress the converted reproduction data, and receive television broadcasting; and
causing said control means to switch between a first path for outputting the second video signal to the display device, and a second path for outputting the third video signal to the display device.

* * * * *